(12) United States Patent
Hsu

(10) Patent No.: US 7,021,133 B1
(45) Date of Patent: Apr. 4, 2006

(54) TIRE CONDITION SENSING APPARATUS AND MOUNTING METHOD THEREOF

(75) Inventor: Shao-Chun Hsu, Dashe Shiang (TW)

(73) Assignee: Lite-On Automotive Corp., Kaohsiung (TW)

( * ) Notice: Subject to any disclaimer, the term of this patent is extended or adjusted under 35 U.S.C. 154(b) by 0 days.

(21) Appl. No.: 11/153,506

(22) Filed: Jun. 16, 2005

(51) Int. Cl.
*B60C 23/02* (2006.01)

(52) U.S. Cl. ...................................... 73/146.8

(58) Field of Classification Search ................. 73/146, 73/146.3, 146.8; 340/442–448; 301/37.25, 301/37.26, 37.32, 37.33, 37.101
See application file for complete search history.

(56) References Cited

U.S. PATENT DOCUMENTS 5,844,131 A 12/1998 Gabelmann et al.
6,568,259 B1 * 5/2003 Saheki et al. ................. 73/146
6,606,903 B1 * 8/2003 Hsu ........................... 73/146.8
6,739,187 B1 * 5/2004 Luce .......................... 73/146.8
6,865,932 B1   3/2005 Luce
6,959,597 B1 * 11/2005 Ito et al. ..................... 73/146.8

* cited by examiner

*Primary Examiner*—William Oen
(74) *Attorney, Agent, or Firm*—Rabin & Berdo, PC

(57) ABSTRACT

A tire condition sensing apparatus and a mounting method thereof are disclosed for adjusting the angle and length of a valve stem to be mounted on various types of rims. The tire condition sensing apparatus comprises a housing and a valve assembly, wherein the housing comprises a pair of wing plates having first contact surfaces, and an open end is formed between the wing plates, and the valve assembly is pivotally connected in the open end of the wing plates, and the valve assembly includes a ring pad having second contact surfaces corresponding to the first contact surfaces, thereby providing a connection mechanism for greatly adjusting the angle between the valve assembly and the housing, and firmly securing the tire condition sensing apparatus on a rim.

13 Claims, 5 Drawing Sheets

TIRE CONDITION SENSING APPARATUS AND MOUNTING METHOD THEREOF

FIELD OF THE INVENTION

The present invention relates to a tire condition sensing apparatus and a mounting method, and more particularly, to the generic-typed tire condition sensing apparatus and the mounting method thereof which can be flexibly mounted on various types of rims belonging to vehicle tires.

BACKGROUND OF THE INVENTION

Insufficient automobile tire pressure at least will result in awkward driving, such as more gas consumption, lower tire endurability and shorter tire operation life, and even worse, will cause a flat tire which endangers passengers' life and driving safety. A tire condition sensing apparatus can assist a driver at any time inside the car to check the tire conditions, such as tire pressure, tire temperature, etc., thereby effectively increasing vehicle safety.

Generally speaking, a tire condition sensing apparatus is mounted on a rim of a vehicle tire, and includes a housing accommodating a sensor and a power source such as a battery. The sensor can detect the conditions (such pressure and temperature) inside the tire, and then transmit tire internal condition signals to a receiver located outside the tire. The receiver further evaluates the tire internal condition signals and provides the information of tire internal condition to a driver via a display apparatus mounted on the vehicle.

When the aforementioned housing and a valve stem are connected, and are assembled on a rim of a vehicle tire, the valve stem extends out from a though hole located on a sidewall of the rim, and then is fastened to the sidewall by a nut. After the valve stem is fixed on the sidewall of the rim, if the angle between the valve stem and the housing is not proper, the housing cannot contact the rim bed and is hung in the air. The housing hung in the air will be vibrated by the centrifugal force due to tire spinning, thus disadvantaging stable driving. In some worse situations, the housing hung in the air will hit the rim, thus resulting in the problems of damaging the tire condition sensor received therein, breaking the housing, or the valve stem detached from the housing, etc. The housing fragments or the free valve stem are very like to pierce the tire, thus affecting driving safety. Hence, how to make the housing firmly seat on the rim has become quite an important issue.

On the other hand, sine there are quite a lot of rim types, based on the consideration of the safety for assembling the aforementioned tire condition sensing apparatus, the length of the valve stem or the fixing angle between the valve stem and the housing has to be changed with respect to different types of rims, thereby ensuring the stability of the tire condition sensing apparatus mounted on the rim. However, those design changes causes the increase of production cost and user inconvenience.

U.S. Pat. No. 5,844,131 discloses a tire pressure sensing apparatus including a housing having at least two base seat members for placing the apparatus on the wheel rim. U.S. Pat. No. 6,865,932 discloses a device for mounting a sensor on a motor vehicle wheel rim, wherein two stop elements are arranged on both sides of the housing of the sensor for mounting the housing on the rim bed. While being applied to various types of rims, both patent references are not able to adjust the angle between the valve stem and the housing to fasten the sensor on the rim. On the other hand, their valve stems are fixed on the housing, so that the valve stem cannot be replaced with the one of proper length when the length of the valve stem does not fit in with the rim. Therefore, the aforementioned patent references cannot be suitable for use in various types of rims.

Hence, there is an urgent need to develop a tire condition sensing apparatus and a mounting method, thereby adjusting the angle between the valve stem and the housing; and replacing the valve stem with the one of different length, thus effective improving the shortcomings of the conventional tire condition sensing apparatuses.

SUMMARY OF THE INVENTION

An aspect of the present invention is to provide a tire condition sensing apparatus and a mounting method, so as to an adjustable angle between the valve stem and the housing for use in various types of rims, thus achieving the objective of generic-typed tire condition sensing apparatus.

Another aspect of the present invention is to provide a tire condition sensing apparatus and a mounting method, so as to a connecting mechanism allowing the valve stem thereof to be replaced for use in various types of rims.

Another aspect of the present invention is to provide a tire condition sensing apparatus and a mounting method, so as to greatly increase contact friction between the valve stem and the housing for preventing the valve stem from being detached from the housing, thereby ensuring driving safety.

According to the aforementioned aspects, a tire condition sensing apparatus and a mounting method are provided for use in various types of rims belonging to vehicle tires.

According to an embodiment of the present invention, the tire condition sensing apparatus comprises a housing and a valve assembly, wherein the housing receives a tire condition sensor, and comprises a pair of wing plates, and an open end is formed between the wing plates. The valve assembly is pivotally disposed between the wing plates, wherein the valve assembly includes a ring pad corresponding to the wing plates, and the ring pad has second contact surfaces corresponding first contact surfaces of the wing plates, and the first contact surface is complementarily matched with the second contact surface in shape.

Further, In the method for mounting the tire condition sensing apparatus on a rim, at first, a housing receiving a tire condition sensor is provided, wherein the housing includes a pair of wing plates protruding above a first surface of said housing, the wing plates having at least one first contact surface, wherein an open end is formed between the wing plates, both sides of the open end of the wing plates having a pair of supporting holes corresponding and opposite to each other. Then, a valve assembly pivotally disposed in the supporting holes is provided, wherein valve assembly includes a ring pad having at least one second contact surface complementarily matched with the first contact surface in shape, and the ring pad is mounted on the valve assembly and contacts the housing. Thereafter, a fastening element disposed between one end of said valve assembly and said ring pad is provided for firmly fastening said valve assembly on the rim.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
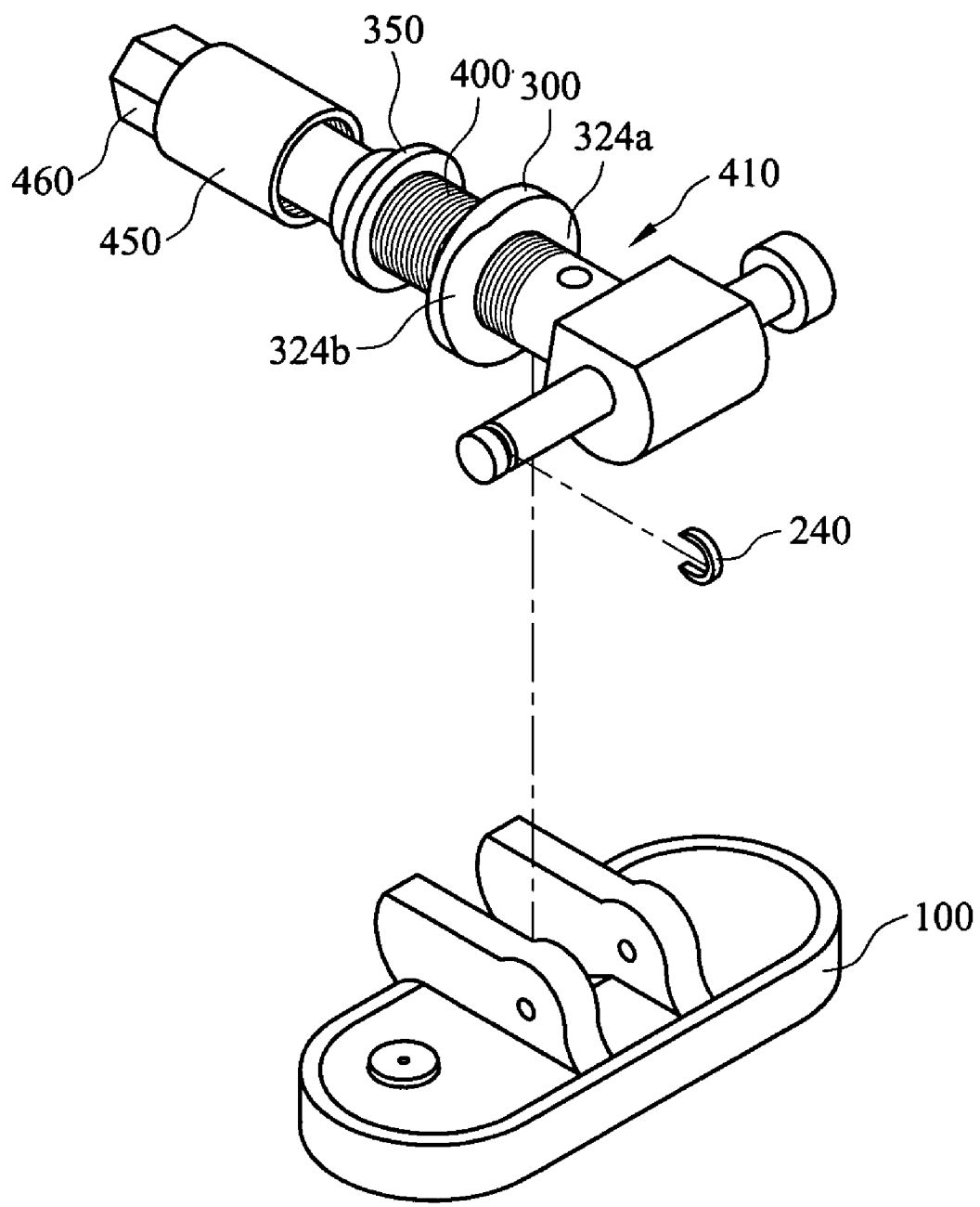
FIG. 1 is a schematic diagram showing a semi-assembled tire condition sensing apparatus according to a first preferred embodiment of the present invention.

Referring to FIG. 1, FIG. 1 is a schematic diagram showing a semi-assembled tire condition sensing apparatus according to a first preferred embodiment of the present invention. The tire condition sensing apparatus comprises a housing 100, a valve assembly 410, a fixing ring 240, a seal 350, a fastening element 450 and a cap 460, wherein the valve assembly 410 includes a valve stem 400 and a ring pad 300, and the valve stem 400 is pivotally disposed on the housing 100. The housing 100 accommodates the electronic components such as a tire condition sensor used for detecting the internal conditions of the tire, such as tire pressure, temperature, etc. The seal 350 is mounted on the valve stem 400 for providing gas-tight effect to prevent gas from leakage. The fastening element 450 (such as a cylindrical nut, a brass cylindrical nut, etc.) is used for locking the valve assembly 410 on a rim. The cap 460 is installed on the outer end of the valve stem 400 for protecting the orifice of the valve stem 400. The ring pad 300 is mounted on the valve stem 400, and has second contact surfaces 324a and 324b which are well matched with the housing 100, wherein the second contact surfaces 324a and 324b are of a concave arc shape. When the fastening element 450 is tightly screwed to the rim, the second contact surfaces 324a and 324b are tightly attached to the housing 100, thereby providing strong locking force and friction for effectively resisting the centrifugal force caused by tire spinning, thus preventing the valve assembly 410 from being detached from the housing 100.

Figure 2A:
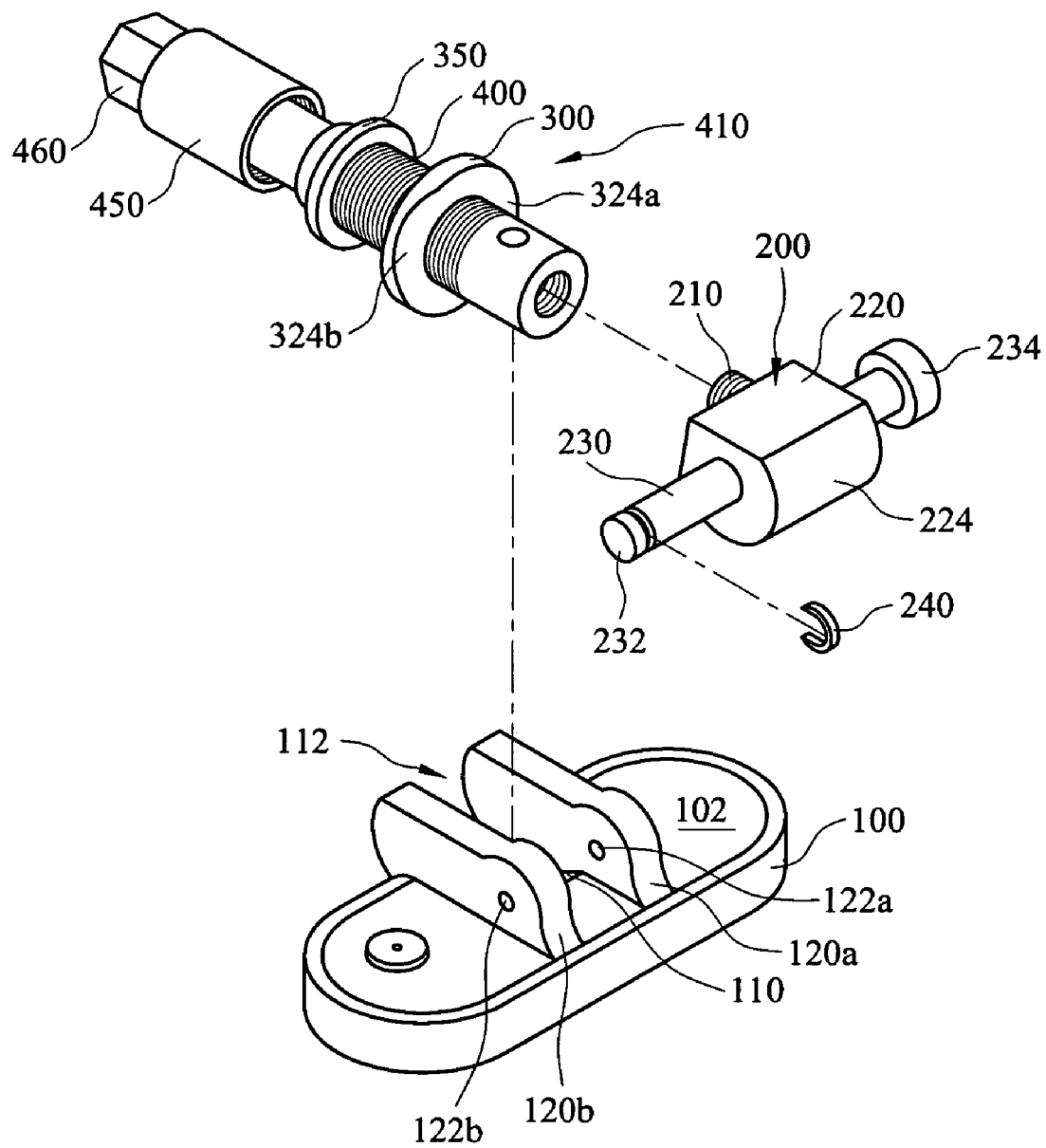
FIG. 2A is a schematic diagram showing a semi-assembled tire condition sensing apparatus according to a second preferred embodiment of the present invention.
Figure 2B:
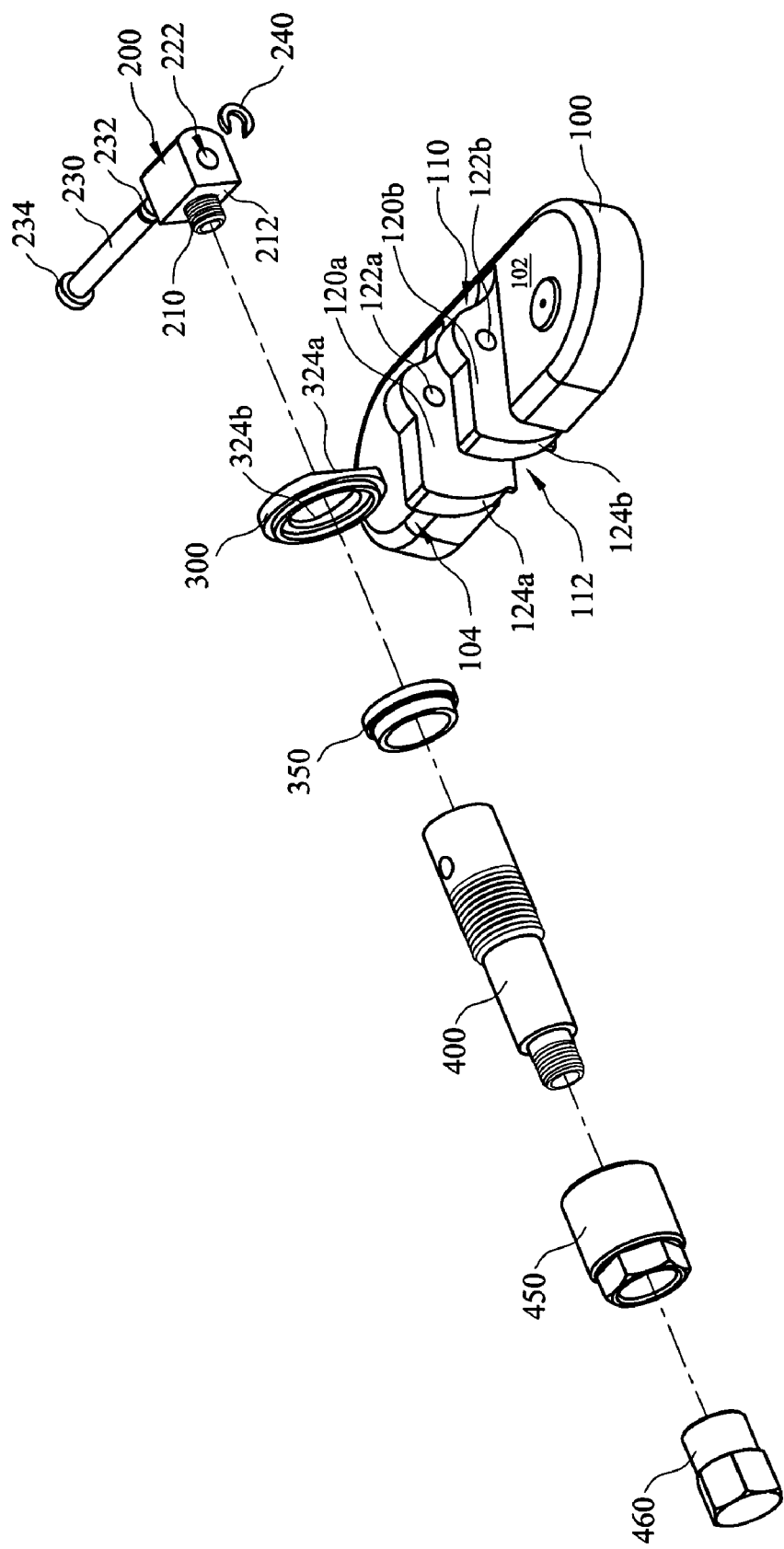
FIG. 2B is a schematic explosive view showing the tire condition sensing apparatus according to the second preferred embodiment of the present invention.
Figure 3:
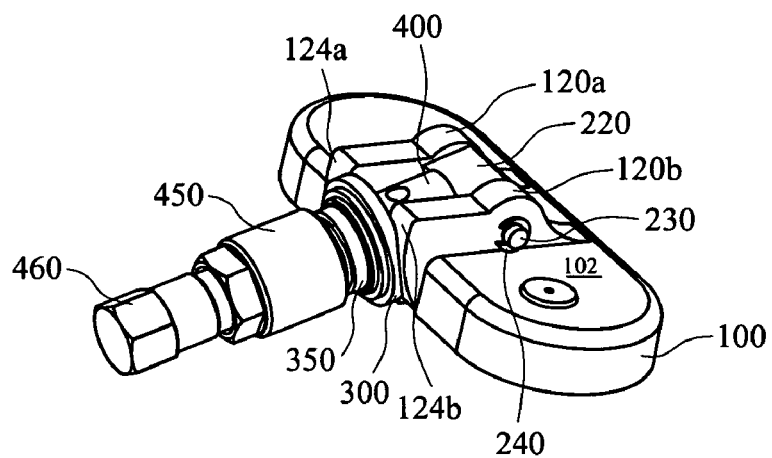
FIG. 3 is a schematic diagram showing the assembled tire condition sensing apparatus according to the first preferred embodiment or the second preferred embodiment of the present invention.

Referring to FIG. 2A, FIG. 2B and FIG. 3, FIG. 2A is a schematic diagram showing a semi-assembled tire condition sensing apparatus according to a second preferred embodiment of the present invention; FIG. 2B is a schematic explosive view showing the tire condition sensing apparatus according to the second preferred embodiment of the present invention; and FIG. 3 is a schematic diagram showing the assembled tire condition sensing apparatus according to the first preferred embodiment or the second preferred embodiment of the present invention. According to the second preferred embodiment of the present invention, the main body of the valve assembly 410 can be composed of the valve stem 400, a jointing member 200 and a fixing pin 230, wherein the valve stem 400 and the jointing member 200 can be formed in one body or separate components. The valve stem 400 is fixed to the jointing member 200. The seal 350 is mounted on the valve stem 400, and is located between the outer end of the valve stem 400 and the ring pad 300. The fastening element 450 is mounted between the outer end of the valve stem 400 and the seal 350 for fastening the valve stem 400 to the rim.

According to the second preferred embodiment of the present invention, the housing 100 has a recession portion 110 and a pair of wing plates 120a and 120b, wherein an open end 112 is formed between the wing plats 120a and 120b. The recession portion 110 is located on a first surface 102 of the housing 100, and extends from a first side 104 of the first surface 102. One end of recession portion 110 located on the side 104 may have the open end 112 (i.e. the recession portion 110 at this end is hollowed out). The wing plates 120a and 120b are disposed on two opposite sidewalls of the recession portion 110, and protrude above the first surface 102 of the housing 100 and above the surface of the housing 100 adjacent to the open end 112, wherein a pair of supporting holes 122a and 122b corresponding to each other are formed on the portion of the wing plates 120a and 120b protruding above the first surface 102, and the bottom of the wing plates 120a and 120b also extends on the first surface 102 for strengthening the structure of the wing plates 120a and 120b. The jointing member 200 is mainly composed of a jointing portion 220 and a connecting portion 210, wherein one end of the valve stem 400 is fixed on the connecting portion 210 of the jointing member 200 by using such as screw threads, i.e. the aforementioned one end of the valve stem has internal screw threads, and the connecting portion 210 of the jointing member 200 has external screw threads mating with the internal screw threads; or the aforementioned one end of the valve stem has external screw threads, and the connecting portion 210 of the jointing member 200 has internal screw threads mating with the external screw threads. Thus, the valve stem 400 can be briefly dismantled so as to selectively replace the valve stem with the one of proper length.

The jointing portion 220 has a jointing through hole 222, and the connecting portion 210 is located on a surface 212 without the jointing through hole 222. The fixing pin 230 can be such as a T-shaped pin having a fixing end 234 and an inserting end 232 opposite to the fixing end 234, wherein the fixing pin 230 penetrates through the supporting holes 122a and 122b and the jointing through hole 222 with the inserting end 232, thereby pivotally connecting the jointing member 200 between the wing plates 120a and 120b. Thereafter, the fixing ring 240 is mounted on the inserting end 232 of the fixing pin 230 so as to fix the fixing pin 230 on the housing 100. Further, such as shown in FIG. 2A, the surface of the jointing portion 220 opposite to the connecting portion 210 can be formed as a contact surface matching with the corresponding bottom surface of the recession portion 110, so that the jointing portion 220 can be smoothly rotated in the recession portion 110. The bottom side of the recession portion 110 can be completely or partially hollowed out, based on the required angle between the valve stem 400 and the housing 100. It is worthy to be noted that the adjustable angle between the valve stem 400 and the housing 100 can be more than 270 degrees. Moreover, just as described above, while being applied in the rims of various designs, the present invention can briefly replace the valve stem 400 with the one of proper length to be fastened on the jointing member 200. Accordingly, by means of the connecting mechanism which can greatly adjust the angle between the valve stem 400 and the housing 100 and can replace the valve stem 400 with the one of different length, the tire condition sensing apparatus of the present invention can be briefly mounted on various types of rims, and thus is a generic-typed apparatus suitable for use in various types of rims.

Further, each of the wing plates 120a and 120b has a first contact 124a or 124b located on the open end 112 of the recession portion 110, and the ring pad 300 has two second contact surfaces 324a and 324b mating with the first contact surfaces 124a and 124b of the wing plates 120a and 120b, wherein the first contact surfaces 124a and 124b are complementarily matched with the second contact surfaces 324a and 324b in shape, such as the matched shapes of a concave arc and a convex arc. When the fastening element 450 is tightly screwed to the rim, the second contact surfaces 324a and 324b are tightly attached to the first contact surfaces 124a and 124b, thereby providing strong locking force and friction for effectively resisting the centrifugal force caused by tire spinning, thus preventing the valve stem 400 from being detached from the housing 100.

Figure 4:
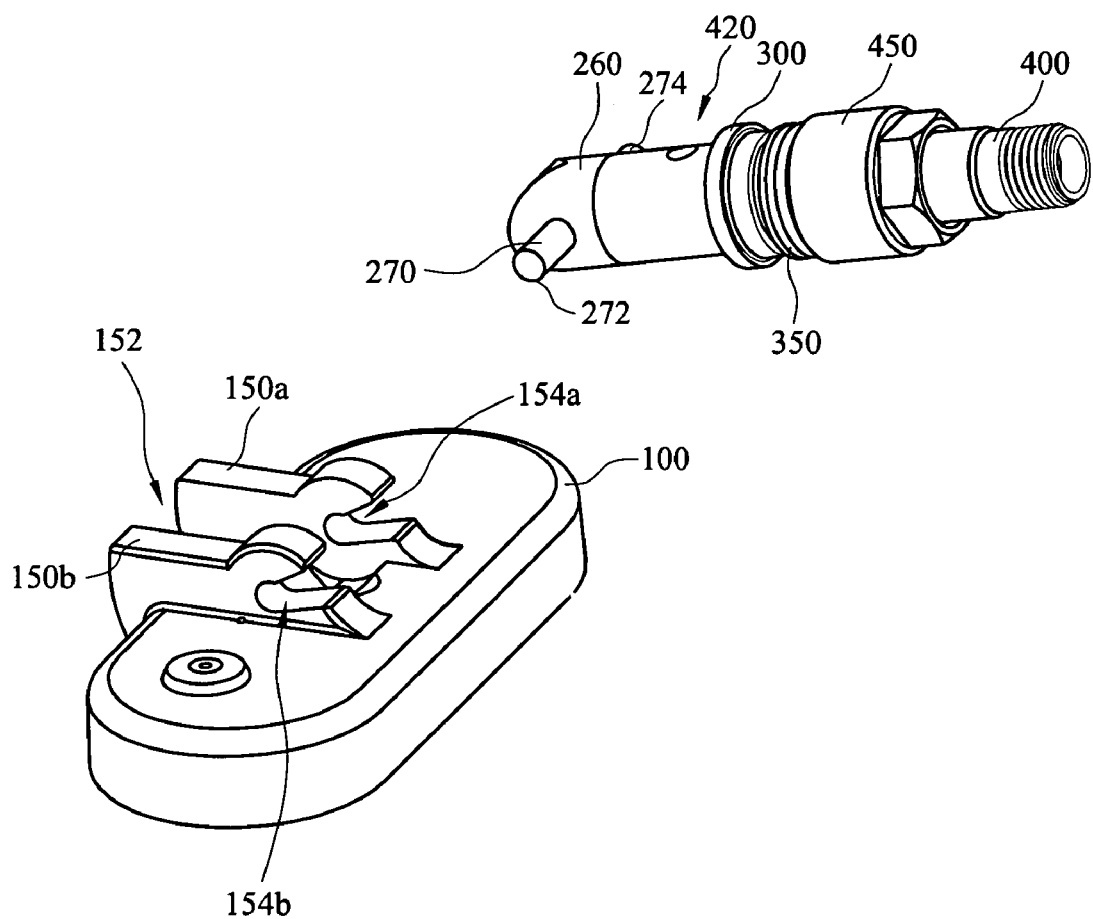
FIG. 4 is a schematic diagram showing a semi-assembled tire condition sensing apparatus according to a third preferred embodiment of the present invention.

Referring to FIG. 4, FIG. 4 is a schematic diagram showing a semi-assembled tire condition sensing apparatus according to a third preferred embodiment of the present invention. Wing plates 150a and 150b are disposed on the housing 100, wherein the wing plate 150a and 150b have first contact surfaces (not shown), and an open end 152 is formed between the wing plate 150a and the wing plate 150b, and a pair of openings 154a and 154b are formed on one side of wing plates 150a and 150b opposite to the open end 152. The shape of the openings 154a and 154b can be such as wide on the font end and narrow on the rear, whereby a valve assembly 420 can be pivotally disposed and engaged in the openings 154a and 154b. The valve assembly 420 includes the valve stem 400 and the ring pad 300, wherein the ring pad 300 has second contact surfaces (not shown) mating with the first contact surfaces of the wing plates 150a and 150b, and the first contact surfaces are complementarily matched with the second contact surfaces in shape. The main body of the valve assembly 420 can be composed of the valve stem 400, a jointing member 260 and a fixing pin 270, wherein the valve stem 400 and the jointing member 260 can be formed in one body or separate components. The valve stem 400 is fixed to the jointing member 260. The fixing pin 270 penetrates through the jointing member 260, and both ends of the fixing pin 270 are engaged in the openings 154a and 154b, whereby the position of the valve stem 400 can be adjusted from one side of the housing 100 at the openings 154a and 154b to the other side of the housing 100 at the open end 152.

The aforementioned jointing methods of the components are merely stated as examples for explanation, and other jointing methods also can be applied in the present invention, so that the present invention is not limited thereto.

Figure 5:
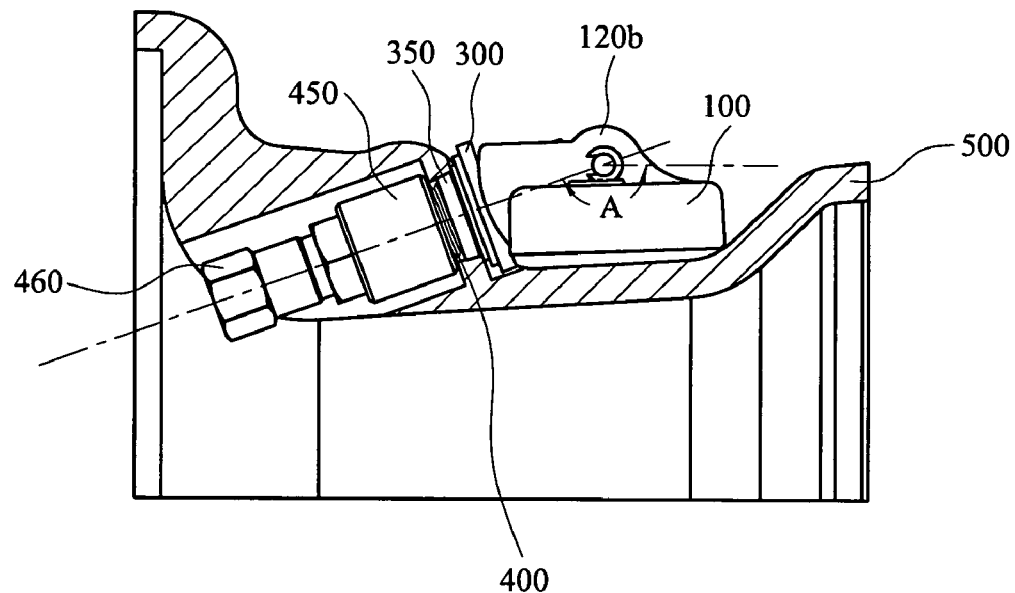
FIG. 5 is a schematic diagram showing the tire condition sensing apparatus of the present invention mounted on a car rim.

Referring to FIG. 5, FIG. 5 is a schematic diagram showing the tire condition sensing apparatus of the present invention mounted on a car rim, wherein a rim 500 is a common car rim. In the method of the present invention for mounting the tire condition sensing apparatus, the valve stem 400 first needs to penetrate through the valve hole located on the rim 500. After the housing 100 is placed on the rim bed of the rim 500, the angle A between the valve stem 400 and the bottom of the housing 100 is adjusted. Thereafter, the fastening element 450 is mounted on the valve stem 400, and then is tightly screwed so as to fix the valve stem 400 on the rim 500, wherein the second contact surfaces 324a and 324b are of a concave arc shape are tightly attached to the first contact surfaces 124a and 124b of the wing plates 120a and 120b (referring to FIG. 2B). Then, the cap 460 is installed on the outer end of the valve stem.

Figure 6:
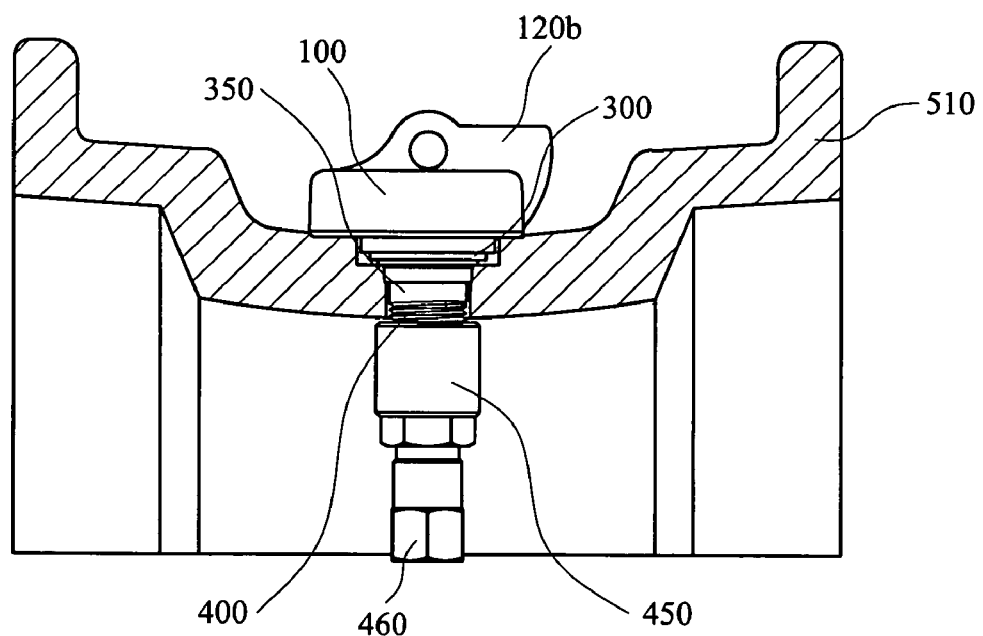
FIG. 6 is a schematic diagram showing the tire condition sensing apparatus of the present invention mounted on a motorcycle rim.

Referring to FIG. 6, FIG. 6 is a schematic diagram showing the tire condition sensing apparatus of the present invention mounted on a motorcycle rim, wherein a rim 510 is a motorcycle rim. When the tire condition sensing apparatus of the present invention is applied in the rim 510, the angle between the valve stem 400 and the housing 100 is greatly increased so as to make the valve stem 400 about vertical to the housing 100, so that the housing 100 can be properly place on the rim bed of the rim 510, and the valve stem 400 can be firmly fixed on the rim 510.

Hence, it can be known from the aforementioned embodiments that the present invention has the following advantages. The angle between the valve stem and the housing can be greatly adjusted, and the valve stem is allowed to be replaced, thereby providing a generic-typed tire condition sensing apparatus. The contact friction between the valve stem and the housing is greatly increased.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A tire condition sensing apparatus, comprising:
   a housing receiving a tire condition sensor, wherein said housing comprises:
      a pair of wing plates disposed on said housing, wherein said wing plates have at least one first contact surface, and an open end is formed between said wing plates; and
   a valve assembly pivotally disposed in said open end of said wing plates, wherein said valve assembly comprises a ring pad having at least one second contact surface corresponding said first contact surface of said wing plates, and said first contact surface is complementarily matched with said second contact surface in shape.

2. The tire condition sensing apparatus of claim 1, wherein said valve assembly comprises:
   a jointing member having a jointing portion and a connecting portion, wherein said jointing portion has a jointing through hole;
   a fixing pin penetrating through said jointing through hole; and
   a valve stem, wherein one end of said valve stem is fixed on said connecting portion of said jointing member.

3. The tire condition sensing apparatus of claim 1, wherein said wing plates protrude above a first surface of said housing, and a pair of supporting holes are formed on said wing plates corresponding to said open end.

4. The tire condition sensing apparatus of claim 3, wherein a recession portion lower than said first surface is formed on said housing corresponding to said open end between said wing plates.

5. The tire condition sensing apparatus of claim 4, wherein the bottom side of said recession portion is completely hollowed out.

6. The tire condition sensing apparatus of claim 4, wherein the bottom side of said recession portion is partially hollowed out.

7. A tire condition sensing apparatus, comprising:
- a housing receiving a tire condition sensor, wherein said housing comprises:
  - a pair of wing plates disposed on said housing, wherein said wing plates have at least one first contact surface, and an open end is formed between said wing plates, and a pair of openings are formed on the sides of said wing plates opposite to said open end; and
- a valve assembly pivotally disposed and engaged in said openings of said wing plates, wherein said valve assembly comprises a ring pad having at least one second contact surface corresponding said first contact surface of said wing plates, and said first contact surface is complementarily matched with said second contact surface in shape.

8. The tire condition sensing apparatus of claim 7, wherein said valve assembly comprises:
- a jointing member;
- a fixing pin penetrating through said jointing member, wherein both ends of said fixing pin are engaged in said openings; and
- a valve stem, wherein one end of said valve stem is fixed on said jointing member.

9. The tire condition sensing apparatus of claim 7, wherein said wing plates protrude above a first surface of said housing.

10. The tire condition sensing apparatus of claim 9, wherein a recession portion lower than said first surface is formed on said housing corresponding to said open end between said wing plates.

11. The tire condition sensing apparatus of claim 10, wherein the bottom side of said recession portion is completely hollowed out.

12. The tire condition sensing apparatus of claim 10, wherein the bottom side of said recession portion is partially hollowed out.

13. A method for mounting a tire condition sensing apparatus on a rim, comprising:
- providing a housing receiving a tire condition sensor, said housing comprising a pair of wing plates protruding above a first surface of said housing, said wing plates having at least one first contact surface, wherein an open end is formed between said wing plates, both sides of said open end of said wing plates having a pair of supporting holes corresponding and opposite to each other;
- providing a valve assembly pivotally disposed in said supporting holes, said valve assembly comprising a ring pad having at least one second contact surface complementarily matched with said first contact surface in shape, wherein said ring pad is mounted on said valve assembly and contacts said housing;
- providing a fastening element disposed between one end of said valve assembly and said ring pad for firmly fastening said valve assembly on said rim.

* * * * *